United States Patent
Milligan

[15] 3,671,807
[45] June 20, 1972

[54] CONTROL APPARATUS
[72] Inventor: Lee J. Milligan, Fairfield, N.J.
[73] Assignee: Peripheral Systems Corp., Fairfield, N.J.
[22] Filed: Dec. 7, 1970
[21] Appl. No.: 95,579

[52] U.S. Cl. ............................317/11 A, 317/31, 317/33 SC
[51] Int. Cl. ....................................................H02h 7/00
[58] Field of Search ............317/11 A, 31, 33 SC, 36 TD; 307/133, 136

[56] References Cited

UNITED STATES PATENTS 3,557,381  1/1971  Henry..................................307/133
3,544,844  12/1970  Pellegrino..........................317/31 X Primary Examiner—D. X. Sliney
Attorney—George E. Kersey

[57] ABSTRACT

Apparatus for controlling the application of power from an alternating current source to a load. The apparatus includes a high power triac switch that is in circuit with the source and the load is operated from a flip-flop by a low level start switch. Closure of the start switch enables a power supply which applies bias to the flip-flop and operates a controller to provide a common potential return for the flip-flop and other constituents when the magnitude of the alternating current source signal is below a prescribed level. This triggers the triac to establish a low impedance path between the source and the load. Excess voltage and current conditions are sensed to cause a change in states of the flip-flop and turn off the triac switch when either an overcurrent or an overvoltage condition is encountered.

8 Claims, 2 Drawing Figures

INVENTOR
LEE J. MILLIGAN
BY George E. Kersey
ATTORNEY

CONTROL APPARATUS

BACKGROUND OF THE INVENTION

This invention relates to control apparatus and, more particularly, to apparatus for the precision control of high power circuitry.

To handle large amounts of power, traditional circuit devices employ mechanical elements. As such, the devices are cumbersome and bulky, but more importantly, they lack the high speed response and precision that are often required.

Accordingly, it is an object of the invention to realize control apparatus for switching a source to a load and thereafter preventing excess signal conditions where precision and high speed response are desirable.

An additional problem is encountered where the switching is of a high power alternating current source. Detrimental transients can occur if the switching of the source to a load takes place when the source signal is at or near the peak of its magnitude. Consequently, it is a further object of the invention to achieve high power switching of an alternating current source without encountering the detrimental effects that can occur when switching takes place at relatively high voltage levels.

Another consideration in circuit control is that switching should be fail-safe. If the signal source should fail and then subsequently be reactivated, the source should not remain switched to the load. In addition, the circuit control arrangement should protect against excess signal conditions. It is a still further object of the invention to realize fail-safe switching of a high power source to a load. Another object is to provide precision, high speed protection against excess signal conditions.

SUMMARY OF THE INVENTION

In accomplishing the foregoing and related objects, the invention provides control apparatus for use in a circuit containing a load and primary source of energy, such as a high power alternating current. Included in the control apparatus is a secondary source of energy, such as a power supply, which is activated from the primary source by a momentary closure of a low power start switch. The power supply then applies bias to the constituents of the control apparatus, including a multi-state device, such as a flip-flop. The latter is accompanied by a start controller to assure operation in a prescribed signal state and operates a desirably bidirectional switch for connecting the primary source to the load. The flip-flop also operates a latch controller to hold the start switch in its closed position as long as the primary source is active. The control apparatus is thus fail-safe.

In addition, to avoid undesirable transient effects, the control apparatus is operated only when the magnitude of the source voltage is below a prescribed level by a zero start controller. This device, which is operated from the power supply, connects the flip-flop and other constituents of the control apparatus to a common signal return point only when the primary source voltage is at a low amplitude level. In one embodiment of the invention, the zero start controller constitutes a silicon controlled rectifier which is triggered to establish a low impedance return connection only when the input signal is at or near a zero voltage level. Once the silicon controlled rectifier has been triggered, it remains in a low impedance condition as long as the control apparatus is energized.

In accordance with another aspect of the invention, the bidirectional switch that connects the primary source to the load is a semiconductive device commonly known as a triac, having two main terminals in circuit with the source and load and a trigger terminal activated from the multi-state device.

In accordance with a further aspect of the invention, a sensor is advantageously provided for the detection of either or both an overcurrent or an overvoltage condition. Each such sensor acts upon a threshold detector which in turn causes the multi-state device to change state when an excess signal condition is encountered and thus deactivate the bidirectional switch.

In accordance with a still further aspect of the invention, the overcurrent sensor includes a current transformer to provide a negligible loading on the circuit between the primary source and the load and also provide substantial circuit isolation.

In accordance with yet another aspect of the invention, the overvoltage sensor is responsive to the power supply and both it and the current sensor are connected to a common bus with the flip-flop and other control apparatus constituents with a return to a common signal point through the zero start controller.

BRIEF DESCRIPTION OF THE DRAWINGS

Other aspects of the invention will become apparent after considering several illustrative embodiments, taken in conjunction with the drawings in which.

DETAILED DESCRIPTION

Figure 1:
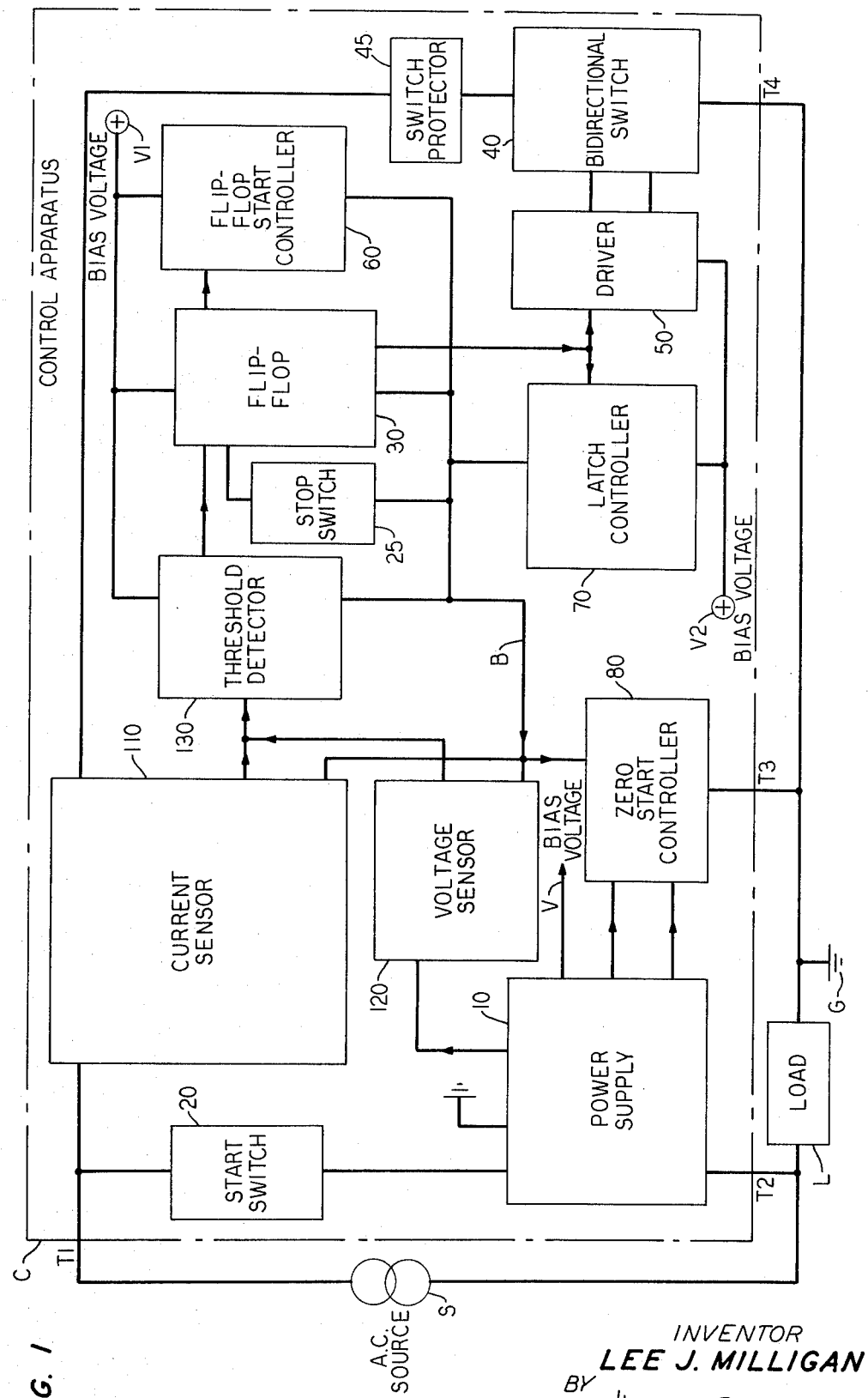
FIG. 1 is a block diagram of control apparatus in accordance with the invention shown in circuit with an alternating current source and a load.

Turning to the drawings, FIG. 1 shows control apparatus C in accordance with the invention interposed in a circuit between an alternating current (A.C.) power source S and a load L. The control apparatus C has four external terminals, T1 through T4, two of which T1 and T2 are connected across the source S and the other two of which T3 and T4 are connected in common to one side of the load L.

The control apparatus C governs the application of power from the source S to the load L, acting variously as a high power switch or contactor between the source S and the load L and also providing overcurrent and overvoltage protection. In the latter capacity the control apparatus C acts as an automatic circuit breaker.

Included in the control apparatus C is a power supply 10 which is energized from the source S over terminals T1 and T2 through a start switch 20. The source S is a primary source of energy, while the power supply 10 is a secondary source that converts energy from the primary source to a form that is suitable for use by the control apparatus C.

The power supply 10 in turn energizes a flip-flop 30 over a bias voltage line V which extends (not shown) to a bias voltage node V2 for the flip-flop 30 and associated units. The flip-flop 30 is a multi-state device which, depending upon its state, is able to actuate a bidirectional power switch 40 through a driver 50. This results in a low impedance path through the switch 40 and permits power from the source S to be applied to the load L. A switch protector 45 prevents short circuit currents from passing through the switch 40 if there is a failure at the load L.

To assure that the flip-flop 30 is in the proper state for actuating the bidirectional switch after closure of the start switch 20, an adjunct to the flip-flop 30 is provided in the form of a start controller 60. In addition a latch controller 70, that is operated by the flip-flop 30, acts on the start switch 20 to keep it closed until a stop switch 25 is actuated.

To prevent the bidirectional switch 40 from operating when the source S is at a relatively high voltage level, and possibly cause undesirable transients, the control apparatus C includes a zero start controller 80. This unit is operated from the power supply 20 to connect the bus line B of the flip-flop 30 when the voltage of the source S is at a suitably low level.

Besides the contactor action provided by the power supply 10, the start switch 20, the flip-flop 30, the controllers 60, 70 and 80, the bidirectional switch 40 and associated units, the control apparatus C includes sensors 110 and 120 and a threshold detector 130 to protect against excess signal conditions, including an overvoltage of the source S and an overcurrent through the load L. When an excess signal condition occurs, one of the sensors 110 or 120, depending on the condition, operates the threshold detector 130 to cause the flip-flop 30 to change state and deactivate the switch 40.

Figure 2:
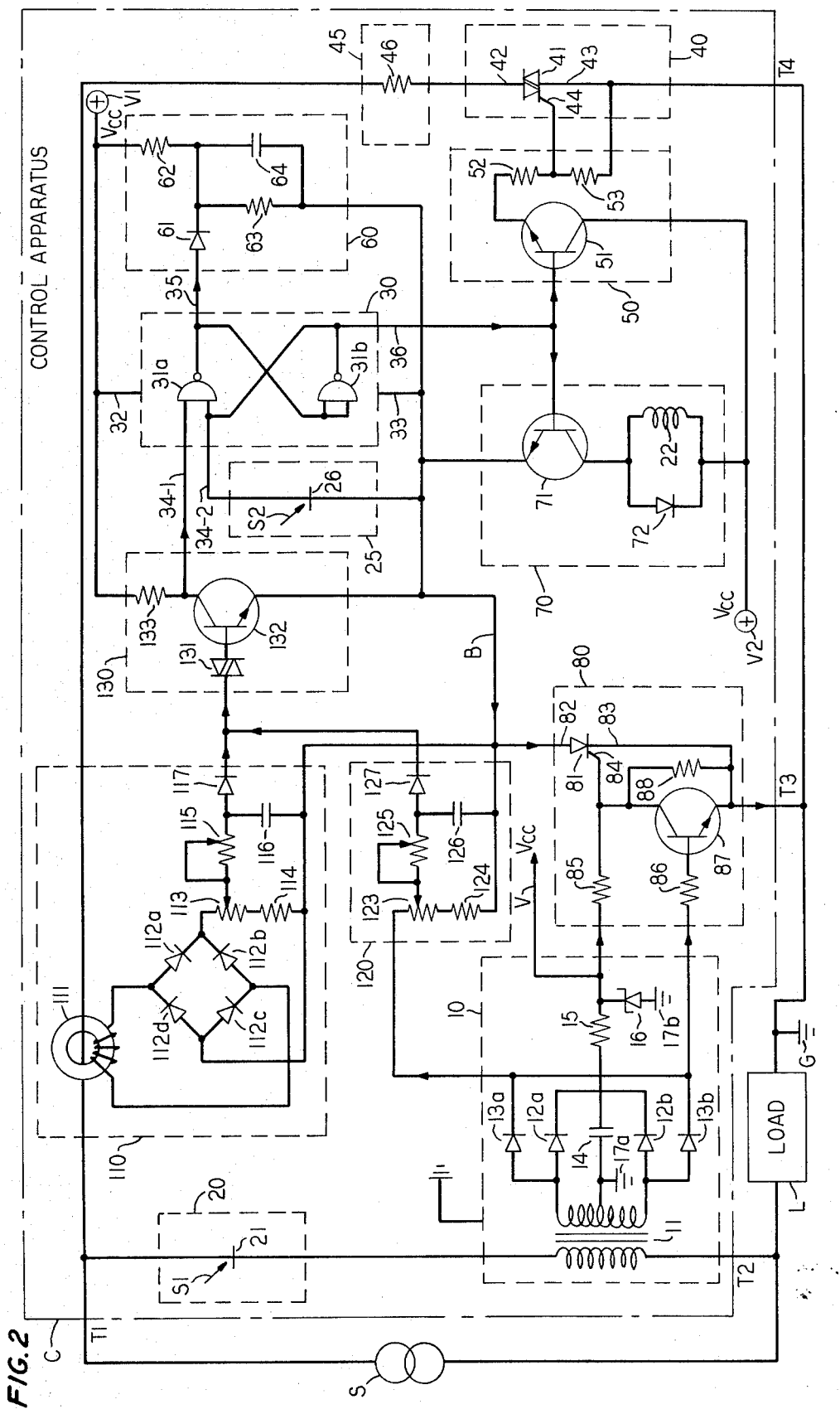
FIG. 2 is a diagram of FIG. 1 showing schematic and wiring details for the control apparatus.

Details of the constituents of the control apparatus C are set forth in FIG. 2. As indicated, the start switch 20 includes normally open contacts 21, desirably of the reed variety in an enclosed housing so that the start switch can be used in an environment where even negligible sparking is undesirable. When a magnetic plunger S1 of the start switch 20 is depressed the normally open contacts 21 are drawn together to permit the power supply 10 to be energized from the primary source S by way of the terminals T1 and T2.

At the power supply 10 a replica of the signal from the source S appears at the secondary of a transformer 11, where it is subjected to full wave rectification by diodes 12a and 12b, smoothed by a capacitor 14 and a resistor 15, and regulated in conventional fashion by a Zener diode 16. Both the center tap of the transformer secondary and the anode of the Zener diode are connected to the common potential point G as indicated at respective positions 17a and 17b. The power supply output on line V provides bias voltage Vcc for the other constituents of the control apparatus C. In particular, bias voltage is applied directly to the zero start controller 80 and to the nodes V1 and V2 for the units associated with the flip-flop 30.

In addition, full wave rectification is provided by diodes 13a and 13b in the power supply 10 to produce a pulsating direct current for the zero start controller 80 and the voltage sensor 120.

The flip-flop 30, which is biased from the power supply 10, is a two-state device formed, for example, by cross-coupled NAND gates 31a and 31b. The bias voltage Vcc is applied to both gates 31a and 31b of the flip-flop 30 over a lead 32. Similarly, a return connection to the power supply 10 is provided for both gates 31a and 31b by a lead 33 which extends to the zero start controller 80 by way of a bus B. The flip-flop 30 has a complementary output lead 35 and a direct output lead 36. When the complementary output is a relatively low level, i.e. a logical "0," the direct output is of a relatively high level, i.e. a logical "1." The direct output lead 36 extends to the driver 50, which is formed by an NPN transistor 51 that is biased at its collector from the power supply 10 at node V2 and is in series with two resistors 52 and 53. The return to the power supply 10 from the second resistor 53 is by way of terminal T4 to the common potential point G.

The driver 50 is used to trigger the bidirectional switch 40 in accordance with the signal state of the flip-flop 30. Illustratively the bidirectional switch 40 is a triac device 41 with two main terminals 42 and 43 in circuit with the load L and the source S and a trigger terminal 44. When a suitably positive voltage is applied to the trigger terminal 44, the impedance between the main terminals 42 and 43 becomes relatively low, but is relatively high otherwise. Thus, when the signal state of the flip-flop 30 produces a relatively high voltage on the direct output lead 36, the transistor 51 of the driver 50 becomes conducting and results in a voltage on the second driver resistor 53 which triggers the triac 41 into its low impedance condition and permits a complete circuit to be established between the source S and the load L. The switch protector 45 for the triac 41 desirably takes the form of a resistor 46 of relatively low resistive magnitude.

The flip-flop start controller 60 assures that the flip-flop 30 will be in the proper signal state to actuate the triac switch 41 after closure of the start switch 20. Forming the start controller 60, which interconnects the complementary output lead 35 of the flip-flop 30 with the bus B, are a routing diode 61 in series with the shunt combination of a resistor 63 and a capacitor 64. If the flip-flop 30 attempts to start with a relatively high voltage on the complementary output lead 35, the capacitor 64 of the start controller 60 acts as a momentary short circuit and forces the flip-flop to change states. Subsequently, the capacitor 64 is charged from the power supply 10 through a bias resistor 62 to prevent interference with the operation of the stop switch 25 as explained below.

Another unit actuated by a relatively high voltage on the direct output lead 36 of the flip-flop 30 is the latch controller 70. This unit includes an NPN transistor 71 in series with the shunt combination of a coil 22 for the reed contacts 21 of the start switch 20 and a protective diode 72. The relatively high voltage on the direct output lead 36 operates the transistor 71 and results in current flow through the coil 22 to keep the reed contacts 21 closed as long as the control apparatus is energized.

The foregoing detailed descriptions of the flip-flop 30 and its associated units 50, 60 and 70 has assumed that connection of the bus B to the common potential point G through the zero start controller 80. The latter is actuated from the power supply 10 only when the signal level of the primary source S is below a prescribed magnitude in order to prevent undesirable transients from operation of the bidirectional switch 40.

Constructionally, the start controller 80 includes a silicon controlled rectifier 81, a first main terminal 82 extending to the bus B and a second main terminal 83 extending to the common potential point G by way of external terminal T3. A trigger terminal 84 of the silicon controlled rectifier extends to bias line V through a resistor 85. A pulsating direct current from the power supply 10 is applied to the base of an NPN transistor 87 in the start controller 80 through a resistor 86. The transistor 87 extends between the trigger terminal 84 and the external terminal T3 and is shunted by a resistor 88.

When the pulsating direct current signal at the base of the transistor 87 is at a relatively high magnitude level, the transistor 87 is driven into conduction and there is insufficient voltage on the shunt resistor 88 to trigger the silicon controlled rectifier 81. However, when the pulsating signal drops to near zero, the transistor 87 becomes non-conducting and a suitable trigger voltage appears across the shunt resistor 88 to produce a low impedance path between the main terminals 82 and 83.

Accordingly, because of the start controller 80, operation of the start switch 20 causes switching of the triac 41 only when the input alternating current signal is at a relatively low level which will not give rise to undesirable transients.

In addition to details of the constituents used in contactor operation of the control apparatus C, FIG. 2 also shows details of the sensors 110 and 120, and the threshold detector 130.

In the sensor 110, which acts upon the flip-flop 30 when an overcurrent condition is detected, there is a current transformer 111 of which the primary winding is that portion of the circuit which extends from the triac 41 to the primary source S. The secondary of the current transformer 111 is connected to a full-wave rectifier formed by diodes 112a through 112d. The bridge load of the rectifier is formed by a variable resistor 113 and a fixed resistor 114. The variable resistor 113 affords control of the overcurrent levels at which a disconnect of the triac switch 41 will occur. In addition, in shunt with the resistors 113 and 114 is a variable resistor 115 and a capacitor 116 to provide a controllable time delay.

In the sensor 120 for detecting an overvoltage condition of the source S there is a pulsating direct current replica of the primary source voltage from the rectifying diodes 13a and 13b across the level control resistors 123 and 124 and applied to the time delay resistor 125 and capacitor 126.

Both sensors 110 and 120 are connected to the threshold detector 130 through respective isolating diodes 117 and 127. Within the threshold detector 130 connection is made through a diac device 131 to an NPN transistor 132. The latter extends from a bias resistor 133 to the bus B. The diac provides a sharp threshold level for the detector 130.

When an overcurrent or an overvoltage condition is sensed by the detector 130, the transistor 132 becomes conducting and applies a low level control signal on an input line 34–1 of the flip-flop 30. This causes the flip-flop 30 to change states and deactivate the triac 41. The change in states is not affected by the start controller because the capacitor 64 has been charged by the bias voltage Vcc and no momentary ground can appear on the complementary output lead 35.

A comparable deactivation of the triac 41 takes place by manual, momentary operation of the magnetic plunger S2 to close reed contacts 26 of the stop switch 25 to apply a low level control signal on a second input line 34-2 of the flip-flop 30.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

What is claimed is:

1. Control apparatus for use in a circuit containing a primary source of energy and a load, comprising
 a secondary source of energy having a common signal point,
  means for activating said secondary source of energy from the primary source thereof,
 a multi-state device energizable by said secondary source,
 means for initiating the energization of said multi-state device when the signal level of said primary source is below a prescribed magnitude level,
 an electrically operated switch connectable in said circuit between said primary source and said load,
 and means for operating said switch from said multi-state device, the initiating means comprising means operated by said secondary source for connecting said multi-state device to said common signal point when the signal level of said primary source is below a prescribed magnitude level and holding the connection until the apparatus is deactivated.

2. Control apparatus as defined in claim 1 wherein the connecting means comprises
 a silicon controlled rectifier interconnecting said multi-state device with said common signal point
 and means operated from said secondary source for triggering said silicon controlled rectifier to provide a low impedance interconnection when the signal level of said primary source is below said prescribed magnitude value and maintaining said low impedance connection thereafter.

3. Control apparatus for use in a circuit containing a primary source of energy and a load, comprising
 a secondary source of energy,
 means for activating said secondary source of energy from the primary source thereof, the activating means including a low level, momentarily closable starting switch,
 a multi-state device energizable by said secondary source and operating a latch device for holding said starting switch in its closed position,
 means for initiating the energization of said multi-state device when the signal level of said primary source is below a prescribed magnitude level,
 an electrically operated switch connectable in said circuit between said primary source and said load,
 and means for operating said switch from said multi-state device.

4. Control apparatus for use in a circuit containing a primary source of energy and a load, comprising
 a secondary source of energy,
 means for activating said secondary source of energy from the primary source thereof,
 a multi-state device energizable by said secondary source,
 means for initiating the energization of said multi-state device when the signal level of said primary source is below a prescribed magnitude level,
 means for assuring that said multi-state device adopts a prescribed state when it is energized by said secondary source,
 an electrically operated switch connectable in said circuit between said primary source and said load,
 and means for operating said switch from said multi-state device.

5. Control apparatus for use in a circuit containing a primary source of energy and a load,
 a secondary source of energy,
 means for activating said secondary source of energy from the primary source thereof,
 a multi-state device energizable by said secondary source,
 means for initiating the energization of said multi-state device when the signal level of said primary source is below a prescribed magnitude level,
 an electrically operated switch connectable in said circuit between said primary source and said load,
 means for operating said switch from said multi-state device,
 means for sensing an excess signal condition on said circuit,
 and a threshold detector responsive to the sensing of said excess signal condition, said detector interconnecting said multi-state device with the sensing means.

6. Control apparatus as defined in claim 5 wherein said sensing means includes means for controlling the time duration before said threshold detector responds to said excess signal condition.

7. Control apparatus as defined in claim 5 wherein said sensing means includes means for sensing an excess voltage condition and an excess current condition in said circuit.

8. Control apparatus as defined in claim 5 for switchably connecting an alternating current power source to a load and for simultaneously providing overcurrent protection, wherein
 said secondary source of energy comprises a power supply having a common signal point and including rectifying means;
 said activating means comprises a reed switch that is momentarily closed to energize said power supply from said power source;
 said multi-state device comprises a flip-flop having at least one input terminal, a complementary output terminal and a direct output terminal, said complementary output terminal being connected to a start controller for providing a control signal on said direct output terminal when said flip-flop is energized;
 the initiating means comprises a silicon controlled rectifier interconnecting said flip-flop with said common signal point and operable from rectifying means of said power supply;
 said electrically operated switch comprises a triac bidirectional semiconductive switch having main terminals in circuit with the load and said power source and a trigger terminal connected to the direct output terminal of said flip-flop;
 and the sensing means comprises a current transformer with a primary winding formed by said circuit and a secondary winding connected to a rectifier to provide a signal to a threshold detector which is in turn connected to the input terminal of said flip-flop.

* * * * *